United States Patent Office

2,893,996
Patented July 7, 1959

2,893,996

N-AMINO DERIVATIVES OF TROPINE ALKALOIDS

Bernard Rudner, Silver Spring, and Aristotle G. Prapas, Baltimore, Md., assignors to W. R. Grace & Co., New York, N.Y., a corporation of Connecticut No Drawing. Application October 14, 1957
Serial No. 689,779

8 Claims. (Cl. 260—292)

This invention relates to derivatives of naturally occurring and synthetic alkaloids. In one specific aspect, it relates to a new class of physiologically active quaternized hydrazinium salts, the chloramine adducts of tropane and its derivatives.

Oxygenated derivatives of tropane occur in nature in the roots and leaves of solanaceous plants, for example, in the atropa belladonna, henbane and thornapple. Atropa belladonna, frequently referred to as nightshade, contains the alkaloid hyoscyamine, $C_{17}H_{23}NO_3$. Hyoscyamine, a useful pharmaceutical, racemizes rapidly in the presence of dilute alkalies or slowly on standing into atropine, likewise a useful pharmaceutical. Atropine is used in medicines to dilate the pupil of the eye and may be applied either externally or internally. Externally, 1 part in 130,000 parts of water exerts a notable effect. Internally, as little as 0.1 g. is poisonous.

When heated in the presence of a base atropine splits into the secondary alcohol, tropine, and the acid, tropic acid. Tropine is a tertiary base as well as an alcohol, and tropic acid is an aromatic hydroxyacid. See Equation 1 below.

(1)
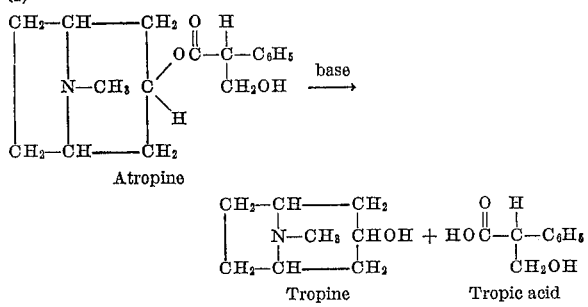

The chemical nucleus of the atropine molecule is the ethylene bridged N-methylpiperidine ring. Or phrasing it another way, the heterocyclic portion of the molecule consists of a piperidine ring and a pyrrolidine ring having two carbon atoms and a nitrogen in common. The simplest member of this generic class is tropane. For convenience, structural formulas are given as if these compounds were planar. Actually the two fused heterocyclic rings are not coplanar.

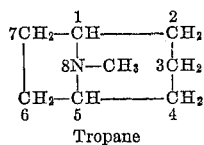
Tropane

Many of the simple derivatives of tropane exist in various stereoisomeric forms. Substitution may generate asymmetric carbon atoms and optical activity can result. The maximum number of optical isomers theoretically possible is $2^n$ where $n$ is the number of asymmetric carbon atoms. Not all of the possible isomers exist because of the geometric requirements of fused ring systems.

There are two 3-hydroxytropanes, tropine and pseudotropine, which differ only in the cis or trans location of the hydroxyl substituent with respect to the N-methyl group. Tropine and pseudotropine each have a plane of symmetry and are consequently optically inactive despite the fact they contain a carbon atom with four different substituents. When tropine is esterified with dl-tropic acid, the product is atropine. This reaction is the reverse of the hydrolysis shown in Equation 1 above.

Another common tropane derivative, cocaine, is obtained from the leaves of the coca shrub in Peru and Java. Cocaine is a local anesthetic, especially used in eye, nose and throat surgery. Because of its rather high toxicity and habit-forming properties, it has been replaced in some of its uses by such synthetic local anesthetics as procaine and butyn. Cocaine melts at 98° C.; it is crystalline and levorotatory. It is a diester of levoecgonine as shown below in Equation 2.

(2)
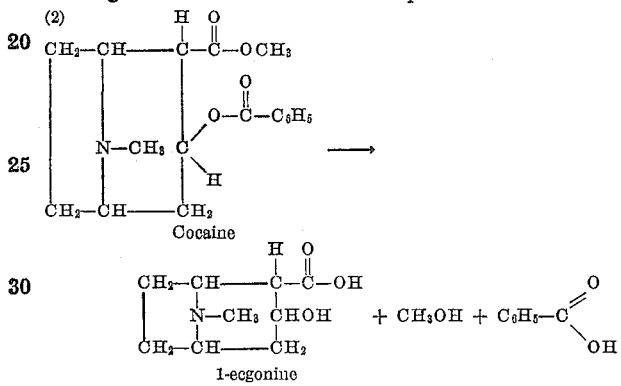

Other well-known compounds and members of this alkaloid family include meteloidine (from datura plants), scopolamine (from hyoscyamus plants), tropinone, scopine and scopoline. In addition to the uses described hereabove, tropane alkaloids are effective as mydriatics, cycloplegics, and as cerebral sedatives in treating motion sickness and the like. Hyoscyamine finds a specific application in relieving symptoms of Parkinson's disease.

It has recently been discovered that chloramine will react with tertiary amines to form tri-substituted hydrazinium chlorides. This new reaction presents practically limitless possibilities for the preparation of novel and interesting chemical compounds which because of their structure and inherent physical properties have a wide range of uses. Tertiary amines are readily available bases. Chloramine is an excellent reagent since it can be economically obtained in commercial quantities by using the well-known process of Harry H. Sisler et al., described in U.S. Patent No. 2,710,248, where chlorine and ammonia are reacted in the vapor phase to produce chloramine (monochloramine). By treating tropane and its derivatives with chloramine, we have discovered a new generic class of hydrazinium salts which have remarkable pharmacological properties and mitigated toxicity.

It is therefore an object of the present invention to provide a new generic class of hydrazinium salts, useful for pharmaceutical and other purposes, which can be made in commercial quantities.

In accordance with the present invention, we have discovered a new and useful generic class of hydrazinium salts corresponding to the general formula:

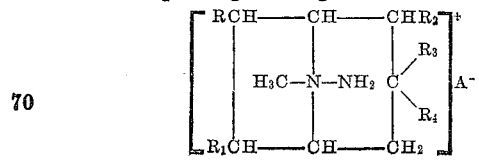

In the above formula, R is selected from a group consisting of H, OH, loweralkoxy or loweralkanoyloxy when taken as an individual substituent. It may also be taken together with $R_1$ to complete an oxirane ring. In addition to completing an oxirane ring with R, $R_1$ may be H, OH or loweralkoxy. It may further represent the necessary atoms to complete a tetrahydrofuran ring with $R_3$. $R_2$ may be H, alkoxy, carboxy, carboxylate or carboloweralkoxy. $R_3$, in addition to representing the necessary atoms to complete the tetrahydrofuran ring with $R_1$, may be H, OH, aryloxy, diphenalkoxy or acyloxy. This latter term should be interpreted to include those acyloxy residues selected from the following: loweralkanoyloxy, benzoyloxy, veratroyloxy, mandeloyloxy, tropoyloxy, atropoyloxy, cinnamoyloxy, diphenylloweralkanoyloxy and diphenylhydroxyloweralkanoyloxy. In addition, $R_3$ may be taken collectively with $R_4$ to complete a carbonyl oxygen. In addition to completing a carbonyl oxygen with $R_3$, $R_4$ may be H. $A^-$ is a pharmaceutically acceptable anion. The primary attributes of such an anion are nontoxicity and pharmaceutical compatibility. Otherwise, the choice of the anion $A^-$ is of little consequence, since the primary activity of our novel compounds resides in the cation. The salts obtained through the variation of $A^-$ may in some cases have special advantages due to solubility, ease of crystallization, lack of objectionable taste and the like, but these considerations are all subsidiary to the characteristics of the cation which are independent of the character of $A^-$. Hence all variations of $A^-$ are considered equivalent for the purposes of the present invention.

Specific, but nonlimiting, variants of the anion $A^-$ are as follows: chloride, bromide, iodide, sulfate, bisulfate, acetate, salicylate, valerate, oleate, phenate, laurate, borate, benzoate, lactate, nitrate, diglycollate, phosphate, imino-tris-acetate, phenylethylbarbiturate, acid phosphate, o-acetoxybenzoate, citrate, diallylbarbiturate, sulfathiazole, theophyllinate, urate, adipate, maleate, fumarate, succinate, tartrate, diethylbarbiturate, penicillinate, guaiacolsulfonate, methylene-bis-cresotinate, camphorate, salicylamide, diphenylhydantoin, carbonate, cacodylate, aconitate, polymethacrylate, poly(styrenesulfonate), phytate, sulfamate, gentisate, malate and the like.

In preparing the compounds of the present invention, it is usually suitable to contact chloramine with a solution of the basic tropane derivative, allow the reaction to proceed until the desired quantity of chloramine is consumed, and then isolate and purify the resultant hydrazinium chloride by standard laboratory techniques. While chloramine is most advantageously prepared in a form of a gaseous chloramine-ammonia-nitrogen stream obtained from a generator constructed according to the teachings of Sisler et al., other methods are equally adaptable for the purposes of the present invention. For instance, chloramine can be made by reacting chlorine with an excess of ammonia in carbon tetrachloride solution or similar halogenated hydrocarbon solvent under controlled conditions of mixing at low temperatures. Such a procedure is fully described in U.S. Patent No. 2,678,258, to John F. Haller. Another effective procedure is that of Coleman et al. fully described in Inorganic Syntheses, vol. I, 59 (1939). Alternatively, the chloramine can be formed in the presence of the amine as described in my copending application S.N. 605,230, filed August 20, 1956, which teaches the reaction of chlorine and a tertiary amine in the presence of excess ammonia. For simplicity, when both the base and product are soluble in the same inert solvent, e.g., chloroform, we may form chloramine in situ by this method in the solution containing the tropane derivative.

The choice of solvent is one of economy and simplicity. For good absorption (and therefore reaction) it is desirable to bubble chloramine through a long column of a solution comprising the tropane derivative dissolved in a relatively cheap inert solvent. Solvents which serve this purpose include hydrocarbons, e.g., heptane, cyclohexane, benzene, xylene and the like; ethers, e.g., diethyl ether, diamyl ether, dioxane and anisole; amides, e.g., dimethylformamide and dimethylacetamide; halohydrocarbons, e.g., chloroform, carbontetrachloride, trichlorethylene, and chlorobenzene; nitroaromatics, e.g., nitrobenzene. For special purposes, water and other hydroxylic solvents such as ethanol and Cellosolve may be used.

Tropane derivatives suitable for chloramination include, but are not limited to, the following: tropane, tropine, pseudotropine, tropidine, 3,7-dihydroxytropane, 6,7-dihydroxytropane, 3-chlorotropane, tropine acetate, pseudotropine benzoate, scopine, scopoline, ecgonine, meteloidine, scopolamine, atropine, atroscine, homatropine, hyoscyamine, apoatropine, teloidine, anhydroecgonine, cocaine, cinnamoylococaine, tropacocaine, α-truxilline, β-truxilline, psicaine, α-cocaine, ecgonidine, benzoylecgonine, tropine diphenylacetate, tropine benzilate, p-chlorobenzhydryloxytropane, 3,6,7-triacetoxytropane, convolamine, methylscopoline, scopoline butyrate, and the like.

It should be further noted that for purposes of the present invention the above compounds can be used directly or as mixtures. Natural mixtures may be chloraminated as such. For example, belladonna extract contains mixed atropine, atrocine, hyoscine and hyoscyamine; the extract of Javanese leaves of erythroxylon coca contain cocaine, benzoylecgonine, methylecgonine, truxillococaine and cocamine.

It is obvious that chloramination gives only the chloride derivative. To provide the other useful tropane hydrazinium salts of the present invention, it is necessary, by metathesis, to prepare salts of other anions. It is possible to make mixed anion salts by adding, for example, the hyoscyaminechloramine adduct to a standard sulfa mixture, e.g. sulfamerzine, sulfamethazine and sulfadiazine to obtain a mixture of the three salts. Many of the anions described supra can be obtained by mixing aqueous solutions of the hydrazinium chloride with appropriate reagents. More often than not, the desired product precipitates directly as the reaction progresses. Certain of the organic salts can be more conveniently made in aqueous alcohol solutions or in other polar solvents. Chloroform is particularly suitable for preparing stearates and other fatty acid derivatives. In fact, it is possible to carry out certain metathetical reactions in the absence of any solvent at all. The method chosen is naturally dependent on the physical properties of the desired salt. When it is necessary to prepare a very soluble salt, the reaction of the hydrazinium hydroxide with the appropriate acid may be utilized. Subjecting a hydrazinium halide to the action of moist silver oxide will give the hydroxide.

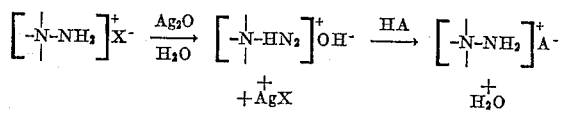

The scope and utility of the present invention is further illustrated by the following examples.

*Example I*

A chloramine generator was constructed according to the teachings of Sisler et al., supra. The generator consists of a horizontal Erlenmeyer flask, the bottom of which contains an outlet tube which is directed into the reactor containing a solution of alkaloid. Ammonia and chlorine (which may be diluted with nitrogen) are introduced separately into the top of the flask through concentric conduits, the inner tube carrying the chlorine. Chloramine and ammonium chloride are formed in the flask at the point where the chlorine and ammonia vapors come into contact. A rod is provided in the chlorine inlet stream to prevent any plugging of that stream with ammonium chloride. The outlet end of the flask is masked with glass wool to collect any ammonium chloride particles which otherwise would be carried into the reactor. The chloramine yield for any one set of gas flow meter readings is determined by removing the reactor and passing the filtered chloramine stream directly into a series of three chilled traps. Under the conditions of chloramine generation, only ammonia, chloramine, and nitrogen can pass through the glass wool into the traps. Since the traps are maintained at at least −70° C., the ammonia and chloramine condense therein and react relatively slowly (compared to the chlorine-ammonia reaction velocity) to form hydrazine, nitrogen and ammonium chloride. By allowing the low temperature condensate to come to room temperature slowly, the chloramine is converted quantitatively to nonvolatile (at 20–30° C.) ammonium chloride, while the ammonia, hydrazine and nitrogen escape by volatilization. Therefore, titration of the white residue (obtained on evaporation of the condensate) for chloride gives a direct measure of the chloramine generated. This can be related back to a measure of the chlorine used to obtain the chloramine yield. There is an alternate procedure which is suitable for use when chloramine is actually being consumed by reaction with the alkaloid. The amount of chlorine used in a run, which may be the limiting reagent quantity for yield calculation, can be measured directly, e.g., by weight of the chlorine cylinder before and after use, or by use of flow meters. The amount of ammonium chloride retained within the generator is determinable by titrating an aliquot of the aqueous solution of all of the solid remaining within the chloramine generator after the reaction has been completed. The chloramine yield, expressed as percent of the theoretical yield, can then be calculated from the formula:

$$\text{Percent} = \frac{(A-B)200}{A}$$

where A is the total number of equivalents of chlorine passed into the generator and B is the number of equivalents of chlorine retained within the generator. The chloride content of the generator thus serves as an indicator of the efficiency of chloramine formation.

Example II

A 50 g. portion of tropinone hydrobromide was dissolved in 200 ml. water. This solution was shaken well with an excess of sodium bicarbonate and thereafter extracted with four 100 ml. portions of $CHCl_3$. The solution was dried over anhydrous magnesium sulfate and the filtrate was made up to 850 ml. with additional $CHCl_3$. The resulting solution was treated with 3.8 equivalents of chloramine from the generator described in Example I over a period of four hours. Within 10 minutes a thick precipitate had formed. Two 250 ml. portions of additional solvent were added to the mixture to thin out this precipitate. The mixture was allowed to stand overnight and thereafter filtered to give 26.1 g. of off-white product. The product comprised ammonium chloride and about 10% N-aminotropinonium chloride. The novel product thus obtained can be alternatively described as 8-amino-3-ketotropanium chloride. Evaporation of the reaction filtrate gave 22 g. of crude product which was combined with 2 g. of the alkaloid adduct extracted from the precipitate. The mixed brown oil and semi-solid thus obtained was washed free of starting base with diethyl ether and benzene. The purified material appeared as a hygroscopic brownish resin melting with gas evolution at about 110° C. and turning red at about 150° C. Continued purification gave an off-white, hygroscopic solid decomposing with gas evolution at about 136° C. It formed 8-amino-3-ketotropanium picrate, having a melting point of 185–187° C. when treated with aqueous picric acid. The novel chloride was soluble in water, ethanol and chloroform. It was insoluble in ether and benzene and recrystallizable from nitromethane. The preparative reaction is shown below in Equation 3.

(3)
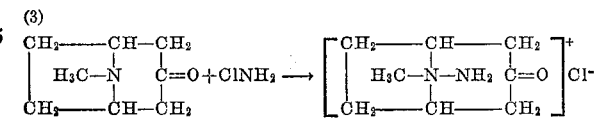

Example III

A saturated solution of 2,4-dinitrophenylhydrazine in 2 N HCl was added to 50 mg. of the product of Example II in 10 ml. $H_2O$. The addition resulted almost immediately in the formation of a flocculent orange precipitate. This material was filtered, washed well, dried, and recrystallized from nitromethane to give yellow-orange flocs of 8-amino-3-ketotropanium chloride 2,4-dinitrophenylhydrazone. This new product decomposed at about 210° C. Its preparative reaction is shown below in Equation 4.

(4)
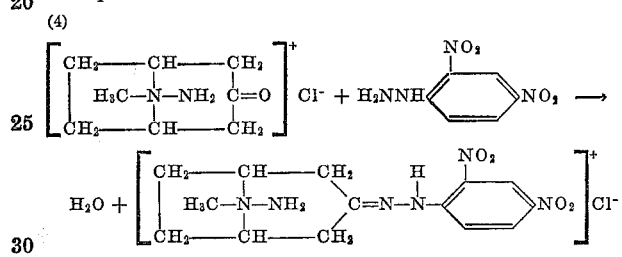

Example IV

A 20 g. portion of tropine was dissolved in 150 ml. of chloroform. This solution was treated with chloramine (formed in the generator in about a 70% yield from 20 g. of chlorine) for approximately one hour. The reaction mixture was allowed to stand overnight. Subsequent filtration gave 30.1 g. of white solid containing 21.9% chloride ion, corresponding to 91.3% pure 8-amino-3-hydroxytropanium chloride, melting above 285° C. This new product was soluble in water and ethyl alcohol. It was insoluble in chloroform and ethyl acetate. Simple metathesis gave its phosphate, hexafluorophosphate, nitrate, chromate, iodide, silicate, and ferricyanide derivatives which were all found to be water soluble. Conversion in the same manner to the picrate, picrolonate and diliturate gave yellow, white and pale yellow microcrystalline water-insoluble solids melting at 280° C., above 280° C. and above 280° C. respectively. The preparative reaction of the novel chloramine adduct is shown in Equation 5.

(5)
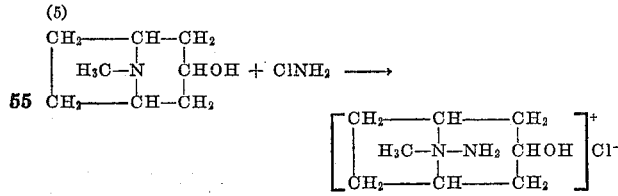

Example V

A 100 mg. portion of the product of Example IV was dissolved in 10 ml. of water and then treated dropwise alternately with 20% NaOH solution and an equivalent portion of benzoyl chloride according to the standard Schotten-Baumann reaction; adding four equivalents of benzoyl chloride and six equivalents of NaOH in all. After all of the benzoyl chloride have reacted the pH of the mixture was cautiously readjusted to between 8 and 8.5 with acetic acid to give a further precipitate. Subsequent filtration, followed by a thorough washing with cold water, gave about 100 mg. of crude 8-amino-3-benzoyloxytropanium benzoate, melting at 162°–163° C. Recrystallization from water gave a chloride-free product appearing as fine needles. The novel product was recrystallizable from water, soluble in ethanol and insoluble in chloroform. Its preparation is shown below in Equation 6.

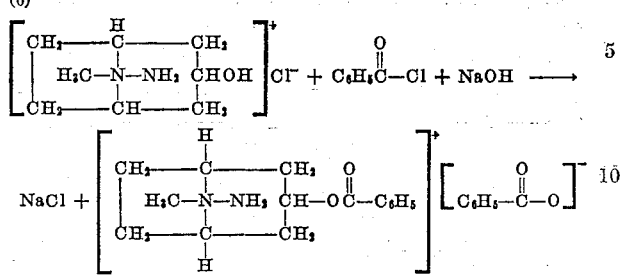

Example VI

A 30 g. portion of atropine sulfate $$(C_{17}H_{23}NO_3)_2 \cdot H_2SO_4 \cdot H_2O$$

was dissolved in 150 ml. of water. This solution was treated with 8-10 g. of sodium carbonate and thereafter extracted with two 150 ml. portions of chloroform. The chloroform extract was dried, filtered and diluted to 1000 ml. with additional solvent. The chloroform solution was treated with chloramine from the generator (converting 0.006 moles of chlorine per minute to $ClNH_2$ in a 92% yield) for 15 minutes. After standing overnight the reaction mixture gave 11 g. of a white solid precipitate containing 29% chloride ion. This analytical result corresponded to a 25% yield of pure N-aminoatropinium chloride, melting at 231° C. Fractional precipitation from isopropyl alcohol gave a middle cut of pure product having the same melting point. The analysis of this material compared with theory as follows: percent C., calculated 59.9, found 59.56; percent H calculated 7.39, found 7.26; percent N calculated 8.22, found 8.33; and percent Cl calculated 10.4, found 10.4. The novel hydrazinium chloride was found to be soluble in water and ethanol; it was insoluble in chloroform. When treated with potassium hexafluorophosphate it formed a water insoluble salt melting at 145° C. By metathesis, the corresponding bromide, sulfamate, phosphate, and nitrate were formed. These novel salts were all water soluble. The preparative reaction is shown in Equation 7 below.

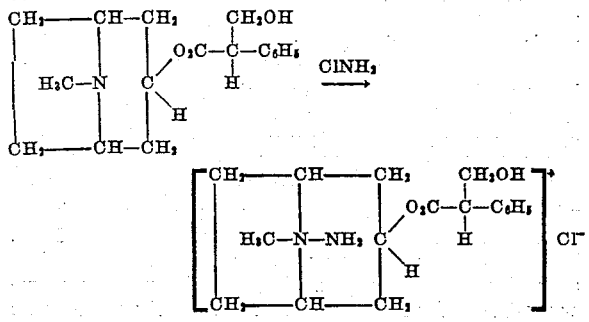

Example VII

Concentrated aqueous solutions of 0.001 mole each sodium barbital and the product of Example VI were mixed and allowed to stand. In the course of two weeks a flocculent white precipitate slowly formed within the mixture. This new product was identified as the 5,5-diethyl barbituric acid salt of the N-aminoatropinium cation, melting at 158–163° C. This same product was more readily prepared in better yield by an alternative procedure involving refluxing similar solutions in ethanol for half an hour allowing them to cool, followed by subsequent filtration, evaporation to dryness, cold water washing and drying. Material thus obtained was recrystallized from an ethanol-ethyl acetate mixture to give white crystals melting at about 168–170° C. and decomposing at about 175° C. Equation 8 shows the preparative reaction.

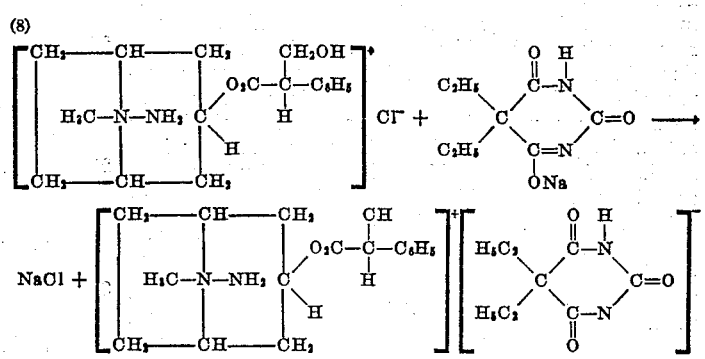

The product thus obtained was somewhat soluble in water and appreciably more soluble in ethanol. It was insoluble in chloroform.

Example VIII

Portions of 0.001 mole each of potassium penicillin G and the product of Example VI were dissolved in 20 ml. of absolute ethanol. The solution was refluxed for half an hour and allowed to cool. It was subsequently filtered and evaporated to dryness in vacuo. Recrystallization of the dried product from an ethanol-ethyl acetate mixture gave a 63% yield of off-white penicillin-aminoatropinium salt. This novel and interesting compound ran clear and evolved gas with darkening at 155° C. on the melting block.

Example IX

A 56.7 g. portion of scopolamine hydrobromide $$C_{17}H_{21}NO_4 \cdot HBr \cdot 3H_2O$$

was treated with aqueous sodium bicarbonate and chloroform by the method described in the previous examples. This treatment gave a chloroform solution containing 29 g. of the free base. Chloramination of the solution followed by filtration and subsequent work up gave a white solid containing 22% chloride ion. Analysis showed this material to be approximately a 27:73% by weight mixture of ammonium chloride and N-aminoscopolaminium chloride, melting with decomposition and sublimation at about 212° C. From the filtrate was obtained on evaporation in vacuo 17.3 g. of material, largely unreacted scopolamine, but containing approximately 4 g. additional product. The initial precipitate was washed well with boiling isopropyl alcohol and ethyl acetate to partially remove the ammonium chloride and other products. This treatment resulted in a solvent-insoluble, water-soluble product about 87% pure, useful in making derivatives. The material was further purified by recrystallization several times from dimethylformamide to get fine needles of pure aminoscopolaminium chloride melting at 206–207° C. with decomposition. Upon analysis, the composition of the purified product compared with theory as follows: percent C calculated 57.13, found 57.54; percent H calculated 6.28, found 6.53; percent Cl calculated 10.09, found 9.99. When treated with aqueous potassium hexafluorophosphate the novel chloride formed a water-insoluble salt. Metathesis with picric acid gave a water-insoluble product melting at 186–8° C. The chloride itself was poorly soluble in chloroform, somewhat more soluble in isopropyl alcohol, and still more soluble in dimethylformamide and nitromethane. It was extremely soluble in water. See Equation 9 below.

(9)
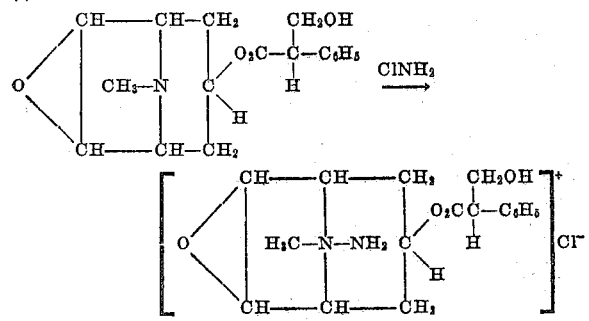

*Example X*

The prolonged reaction of hot isopropyl alcohol with solid N-aminoscopolaminium chloride containing about 13% by weight ammonium chloride impurities in a Soxhlet extraction apparatus gave, on cooling the mixture, a low yield of a tan soft solid melting at about 155–167° C. This novel product can be described as 6-hydroxy - 7 - isopropoxy - 3 - tropoyloxy - 8 - aminotropanium chloride. See the numbering system of the tropane ring described earlier in the specification. Recrystallization of the crude precipitate from methanol-acetonitrile gave soft hygroscopic off-white prisms melting at 172–174° C. This product failed to give an insoluble hexafluorophosphate salt when treated with $KPF_6$. It did, however, form a picrate which decomposed at about 140° C. The preparative reaction salt is shown below in Equation 10.

(10)
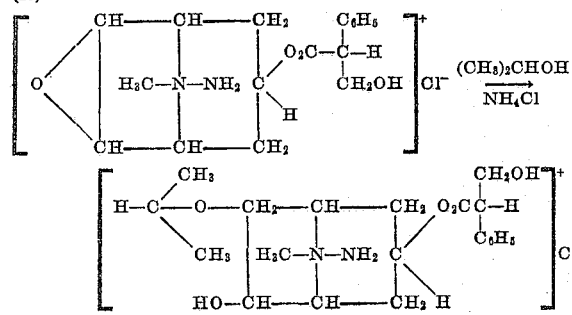

*Example XI*

A 56.6 g. portion of hyoscyamine hydrobromide was converted by the procedure described in Example IX to a chloroform solution containing 44.3 g. of free base. Chloramination gave as an initial precipitate 43.8 g. of white solid. Analysis of the crude product showed 19.3% chloride ion which corresponded to about a 16:84 mixture by weight of ammonium chloride and N-aminohyoscyaminium chloride. The crude product melted at 205° C. By metathesis, it formed a hexafluorophosphate which melted at 74–76° C. The filtrate was allowed to stand an 8.5 g. of additional white solid precipitated therefrom. This material analyzed 9.62% chloride ion which corresponded to about 92% pure hydrazinium chloride. Evaporation of the filtrate gave an additional small quantity of product. The original product was recrystallized repeatedly from dimethylformamide. The purified material melted at 205–207° C. with decomposition. Its preparative reaction is similar to that given in Example VI, since atropine is the hyoscyamine racemate. The adduct, purified to the stage where it became too hygroscopic for convenient handling, still contained slightly less than 2% ammonium chloride. Elemental analysis confirmed this; calculated for a 1.7 $NH_4Cl$: 98.3% adduct mixture: C, 58.8; H, 7.26; N, 8.51; Cl, 11.4. Found: C, 58.6; H, 7.10; N, 8.35; Cl, 11.51. It formed a water insoluble picrate and hexafluorophosphate melting at 76–78° C. and 78° C. respectively. Metathesis also produced a water soluble iodide which melted at 261° C. with decomposition.

*Example XII*

A 50 g. portion of homatropine hydrobromide was converted to the free base in about 1000 ml. of chloroform by the procedure described in the previous examples. Chloramination of this solution gave as an initial precipitate 28.7 g. of a white solid. On the melting block, this material melted at 245° C. with sublimation; by analysis it was found to contain 22.01% chloride ion which represented a mixture of about 20% ammonium chloride and 80% N-aminohomatropinium chloride. Evaporation of the filtrate in vacuo gave 24 g. of brownish pasty solid, part of which melted at 178° C. Treatment of this material by ether extraction resulted in an additional product which was about 84% pure. By metathesis, it formed an insoluble hexafluorophosphate melting at 178–82° C. The product obtained by evaporation of the filtrate appeared to contain a stereoisomer of the product in the initial precipitate, since this latter material gave a hexafluorophosphate melting at 154–55° C. Evaporation of the ether washes gave about 12% unreacted homatropine. Recrystallization of the initial precipitate from dimethylformamide several times resulted in the formation of white needles of N-aminohomatropinium chloride melting at about 250–51° C. with decomposition. This product exhibited the same general solubility characteristics as the N-aminohyoscyaminium chloride of Example XI and similarly was handled most conveniently as a product containing some ammonium chloride. 2.5% ammonium chloride: 97.5% adduct calculated: C, 57.3; H, 6.91; N, 9.21; Cl, 12.2. Found: C, 57.2; H, 6.95; N, 9.02; Cl, 12.2. Treatment of the chloride with saturated aqueous picric acid gave an insoluble dull yellow picrate. After recrystallization from water and aqueous ethyl alcohol, the picrate melted at 163–4° C. The picrate calculated: C, 50.9; H, 4.85; N, 13.5. Found: C, 50.8; H, 4.86; N, 13.5. The preparative reaction of the picrate is shown below in Equation 11.

(11)
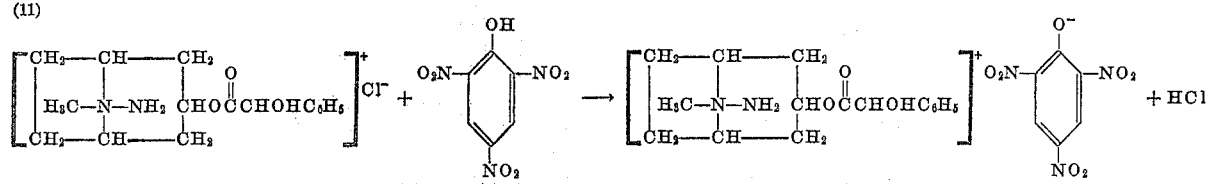

*Example XIII*

A 26 g. portion of cocaine was dissolved in chloroform in the manner previously described and treated with a large excess of chloramine from the generator. Analysis of the initial precipitate obtained from this reaction mixture showed the crude material to contain about 82% ammonium chloride and 18% N-aminococainium chloride (8-amino-2-carbomethoxy-3-benzoyloxytropanium chloride). Evaporation of the chloroform filtrate gave 27.7 g. of mixed unreacted base and product. The 6.1 g. of product thus obtained represented 85% conversion based on the recovered amine. Ether extraction of a small portion of the product left as an ether-insoluble residue, the relatively pure chloramine adduct, melting at about 148° C. Metathesis resulted in an insoluble picrate melting at 65–67° C. Resistance of cocaine to chloramination, demonstrated in replicate runs, may be due to steric factors. The preparative reaction of the novel N-aminococainium chloride is shown below in Equation 12.

(12)

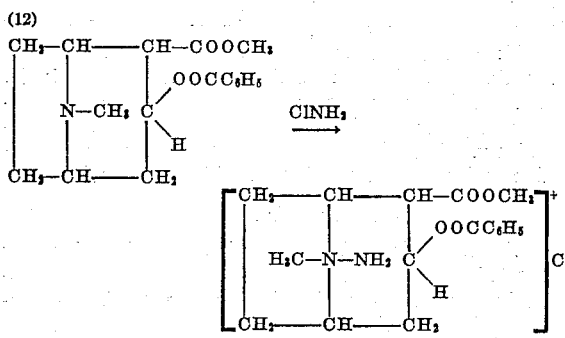

*Example XIV*

About 500 mg. of crude N-aminococainium chloride was boiled in 10 ml. of concentrated HCl for half an hour. Additional quantities of HCl were added as needed during the reaction. The mixture was evaporated dry, treated and evaporated dry twice with isopropyl alcohol, and extracted with ether to remove benzoic acid. The resulting material was extracted with isopropyl alcohol and the extract evaporated to dryness to give about 50 mg. of off-white N-aminoecgoninium chloride (2-carboxy-3-hydroxy-8-aminotropanium chloride). This novel salt dehydrated at about 118–121° C. and melted at about 186° C. The product was soluble in water and ethanol. Treatment of a concentrated aqueous solution with sodium hydroxide gave a trace solid believed to be the corresponding betaine. See Equation 13 below.

(13)

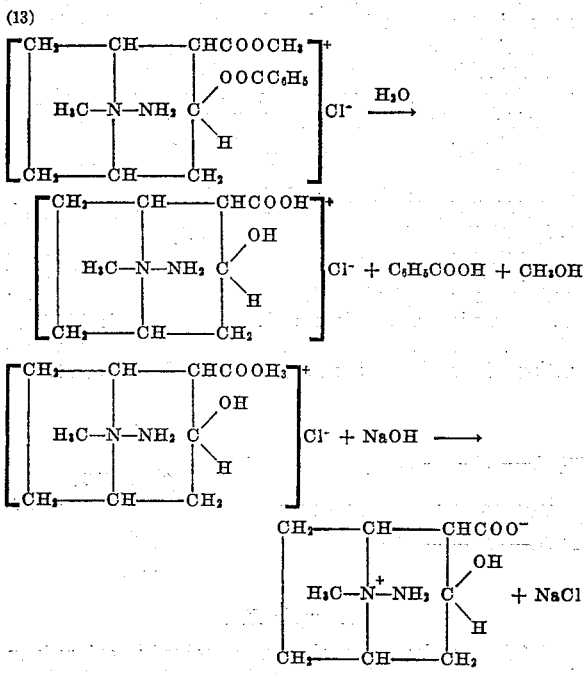

*Example XV*

A 100 mg. portion of N-aminohomatropinium chloride (the product of Example XII) was added to 50 ml. of refluxing isopropyl alcohol without complete dissolution. The solution was then treated with 50 mg. of sodium salicylate and refluxed for 3 more hours. Subsequent cooling, filtration and evaporation to dryness gave crude aminohomatropinium salicylate. The crude product was recrystallized from an ethanol-ethyl acetate mixture to give about 50 mg. of white crystals, M.P. 158–159.5° C. The novel product was soluble in water and ethanol and somewhat soluble in acetone and chloroform.

*Example XVI*

A 100 mg. portion of N-aminohyoscyaminium chloride (the product of Example XI) and a corresponding amount by weight of calcium o-acetoxybenzoate (sometimes called calcium acetylsalicylate) were dissolved in 30 ml. of water. The solution was evaporated dry in vacuo, extracted with 450 ml. portion of ether and taken up with 30 ml. of isopropyl alcohol. This solution was filtered and the filtrate was treated with 90 ml. of ether and allowed to settle. Subsequent filtration gave a low yield of N-aminohyoscyaminium o-acetoxybenzoate, appearing as white powder melting at 151–153° C. It was somewhat less soluble in water than the product of Example XV.

*Example XVII*

A 100 mg. portion of N-aminoatropinium chloride was mixed well with 100 mg. of sulfanilamide. The reaction product was kept at 120 to 130° C. for an hour and a half with good but occasional mixing. The material was cooled, washed with three 5 ml. portions of acetone and recrystallized from ethanolethyl acetate mixture to give the novel aminotropinium salt of sulfanilamide, melting at 131–33° C.

*Example XVIII*

A 0.1% solution of 1,4-poly(ammonium 2-carbamyl-4-methoxyvalerate) in water (a polymer available commercially as PVM/MA half amide) was treated with 0.003 mole of N-aminoatropinium chloride in 20 ml. of water. The mole ratio of the reactants corresponded to about 1 part of the polymer to ½ part of the hydrazinium chloride. The reaction mixture was stirred well, filtered and washed with water to give about 170 mg. of the corresponding mixed hydrazinium ammonium salt of the polymer decomposing at about 210° C.

*Example XIX*

A mixture of 0.2 g. (Ca 0.001 mole) of aminotropinium chloride, 0.5 g. (Ca. 0.002 mole) of benzhydryl bromide and 0.075 g. of anhydrous sodium carbonate (ca 0.0007 mole) were stirred in 20 ml. of pyridine at room temperature for 16 hours and then at 60° C. for 3 hours additional. See Equation 14. The inhomogeneous reaction mixture was evaporated to dryness in vacuo without heat and the incompletely solid residue was washed well with benzene to remove unreacted benzhydryl bromide followed by extraction with cold dry chloroform. Evaporation of the chloroform extract gave a low yield of crude mixed 8-amino-3-benzhydryloxytropanium chloride and bromide (X−) as a thick yellow oil which could not be solidified on chilling, by seeding or scratching. The oil was soluble in water, ethanol, chloroform, Cellosolve; slightly soluble in acetone, recrystallizable from ethyl acetate and insoluble in carbon tetrachloride and dioxane. An aqueous solution gave the dull yellow amorphous picrate melting at 178–181° C.

(14)

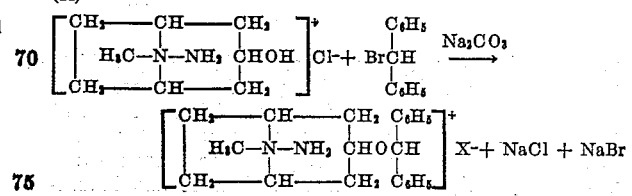

Example XX

To a mixture of 0.2 g. aminotropinium chloride, 2 ml. pyridine and 10 ml. chloroform there was added dropwise and with vigorous intermittent shaking a solution of 0.25 g. diphenylacetyl chloride in 20 ml. anhydrous chloroform. The reaction mixture was allowed to stand with intermittent shaking for 48 hours. The reaction is shown in Equation 15. The reaction mixture was evaporated to dryness in vacuo and the resultant tan solid slurried twice with dry benzene, filtered and air dried. The solid was slurried with 5 ml. of 5% aqueous sodium carbonate, filtered and evaporated to dryness in vacuo. Extraction with isopropyl alcohol and evaporation of the solvent gave tan amorphous 8-amino-3-diphenylacetoxy-tropanium chloride. The crude product was recrystallized from ethanol-ethyl acetate to give off-white granular crystals melting 146–8.5° C. with decomposition. When a boiling aqueous solution was treated with a 10% solution of potassium iodide, the brownish yellow iodide slowly separated out on cooling as irregular plates melting 191–2.5° C. with decomposition.

(15)

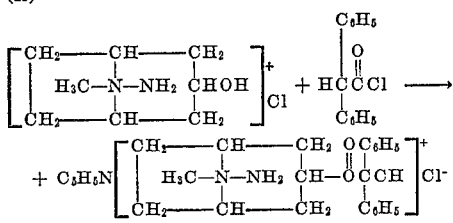

Example XXI

To further demonstrate the utility of our novel compounds, pharmacological studies were made on N-aminoatropinium chloride, N-aminoscopolaminium chloride and N-aminohomatropinium chloride. These were tested at various concentrations against sub-maximal contractions of guinea pig ileum (isolated smooth muscle) caused by acetylcholine chloride, histamine phosphate, serotonin creatinine sulfate and barium chloride. At a concentration of 25 micrograms (1:4,000,000) all three compounds completely blocked contractions due to acetylcholine but had no effect on contractions induced by histamine, serotonin or barium. This is indicative of strong antispasmodic action. At one gamma (1:100,000,000), N-aminohomatropinium chloride had lost its activity; at one-tenth gamma (1:1,000,000,000), N-aminoscopolaminium chloride was still moderately effective. This anticholinergic or parasympatholytic effect was confirmed in pharmacodynamic studies on the dog with the scopolamine derivative showing exceptionally marked action. The acute intraperitoneal $LD_{50}$ (50% lethal dose in white mice) for N-aminoatropinium chloride, N-aminoscopolaminium chloride and N-aminohomatropinium chloride were 150, 200 and 135 mg./kg. respectively. Our novel compounds combine atropine-like physiological activity, increased potency and diminished toxicity in a highly desirable fashion.

We claim:

1. New chemical compounds having the general formula:

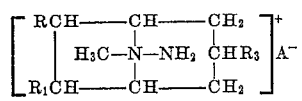

wherein R and $R_1$ taken individually are hydrogen and R and $R_1$ taken collectively are oxygen completing the oxirane ring; $R_3$ is a member selected from the group consisting of benzoyloxy, cinnamoyloxy, phenylloweralkanoyloxy, diphenylloweralkanoyloxy and phenylhydroxyloweralkanoyloxy; and A is a pharmaceutically neutral anion.

2. Compounds according to claim 1 wherein R and $R_1$ are hydrogen and $R_3$ is phenylhydroxyloweralkanoyloxy.

3. Compounds according to claim 1 wherein R and $R_1$ are oxygen completing the oxirane ring and $R_3$ is phenylhydroxyloweralkanoyloxy.

4. Compounds according to claim 1 wherein R and $R_1$ are hydrogen and $R_3$ is diphenylloweralkanoyloxy.

5. As a new chemical compound, N-aminohomatropinium chloride.

6. As a new chemical compound, N-aminoatropinium chloride.

7. As a new chemical compound, N-aminoscopolaminium chloride.

8. As a new chemical compound, 8-amino-3-diphenylacetoxytropanium iodide.

No references cited.